Oct. 9, 1951        D. A. LYONS        2,570,256
INDUSTRIAL TRUCK WITH HAND TILTED FRAME
Filed Nov. 7, 1947        2 Sheets-Sheet 1
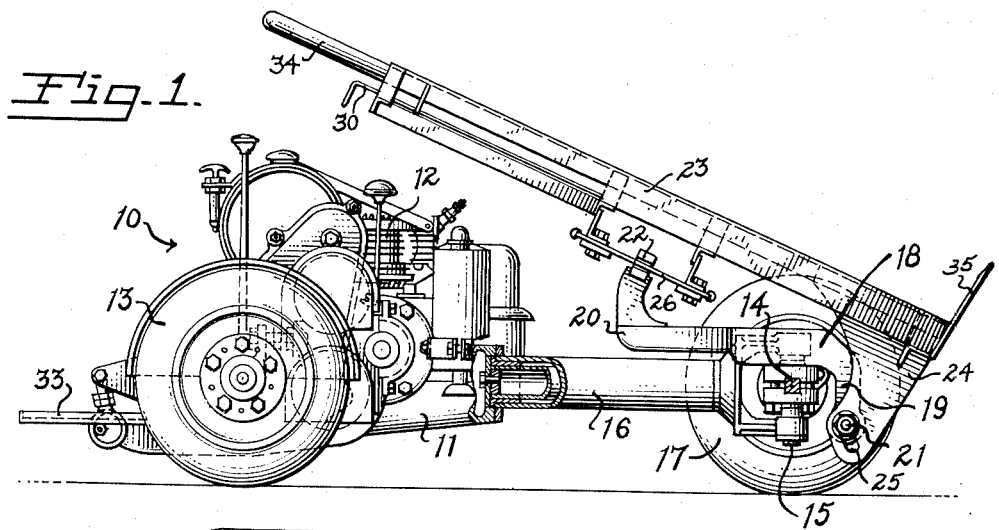
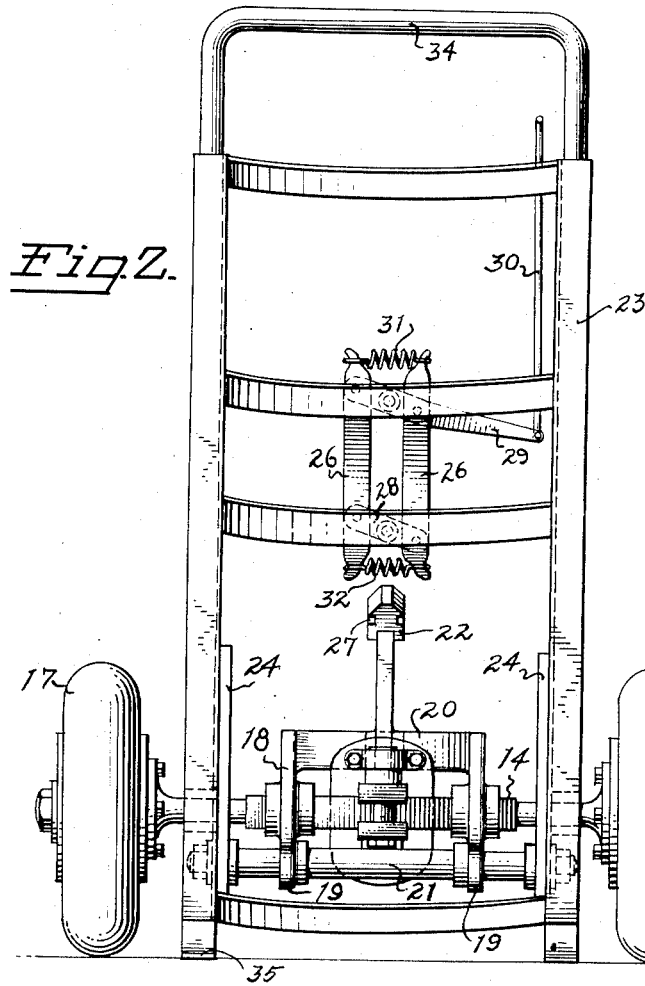
INVENTOR.
DAN A. LYONS.
BY
ATTORNEY Oct. 9, 1951 D. A. LYONS 2,570,256
INDUSTRIAL TRUCK WITH HAND TILTED FRAME
Filed Nov. 7, 1947 2 Sheets-Sheet 2
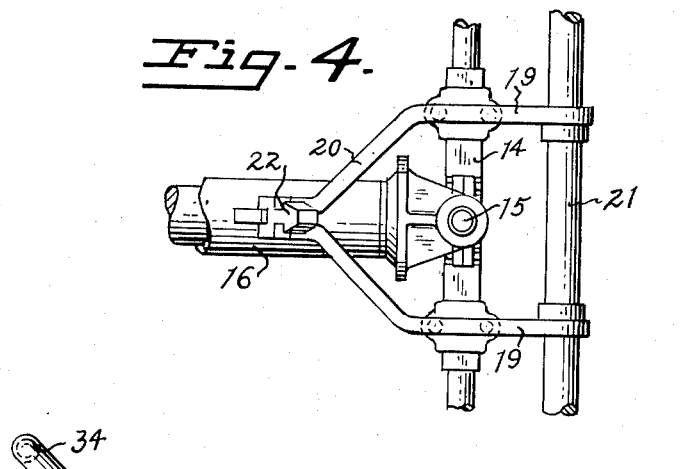
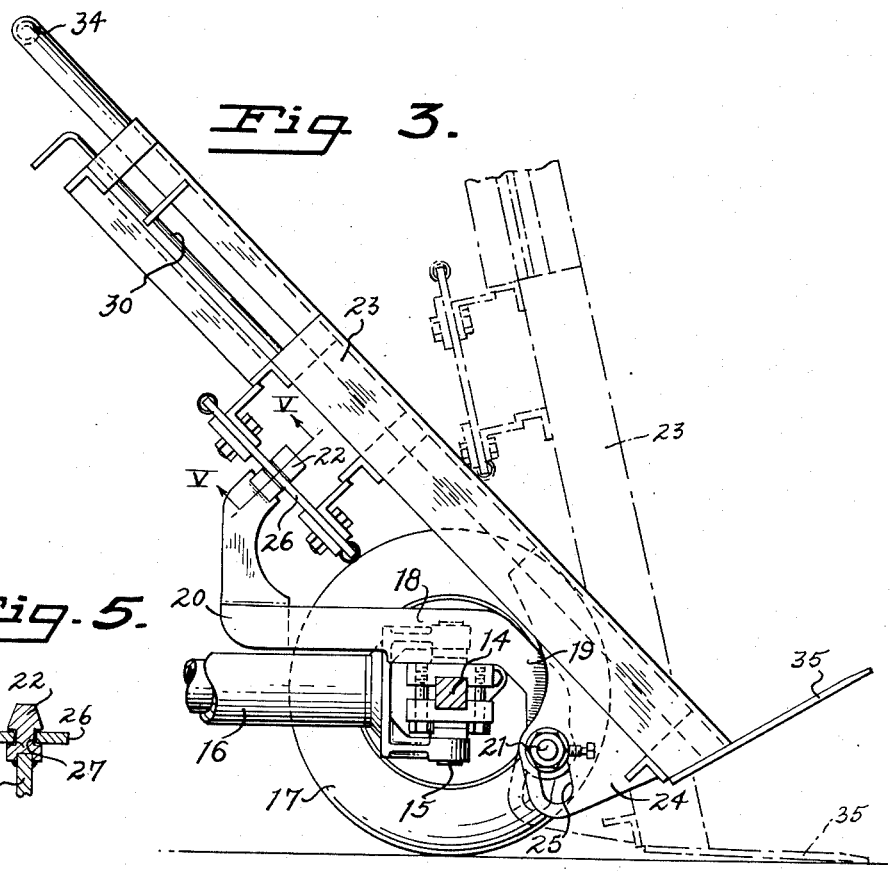
INVENTOR.
DAN A. LYONS
BY
ATTORNEY Patented Oct. 9, 1951

2,570,256

UNITED STATES PATENT OFFICE 2,570,256

INDUSTRIAL TRUCK WITH HAND TILTED FRAME

Dan A. Lyons, Seattle, Wash., assignor, by mesne assignments, to Young Iron Works, Seattle, Wash., a corporation of Washington Application November 7, 1947, Serial No. 784,547

5 Claims. (Cl. 214—65)

The present invention relates to industrial trucks such as are used for transporting merchandise for short distances from one point to another as in unloading freight cars and the like, and more particularly it relates to an improvement in the mounting of a pivotally mounted load carrying frame upon a chassis having relatively large pneumatically tired supporting wheels.

An object of the invention is to provide a new and novel improvement in industrial trucks which is simple in construction, practical in operation and inexpensive to manufacture.

Another object of the invention is to provide an industrial truck of the so-called tilting type in which a load carrying frame mounted upon a chassis may be tilted forward into engagement with a load independently of the chassis and then tilted back and into a load balancing position upon the chassis in a new and novel manner.

A further object of the invention is to provide a mounting for a load carrying frame upon a pneumatically tired chassis which may be tilted forwardly to receive a load and then reclined when transporting the load from one point to another and in which means are provided to permit the full and complete operation of the load carrying frame under all conditions of operation and irrespective of any deflation of the tires which would tend to lower the axis about which the pivotally mounted truck operates.

Other objects and advantages of the invention will be in part evident to those skilled in the art and in part pointed out hereinafter in connection with the accompanying drawing, wherein there is shown by way of illustration and not of limitation a preferred embodiment of the invention.

In the drawings:

Figure 1 is a side view with parts removed showing the invention as applied to a motorized truck of the scooter type, Figure 2 is a front view of the invention as shown in Figure 1 with the load carrying frame tilted forward, Figure 3 is an enlarged fragmentary view showing details of the load carrying frame of Figure 1 of the drawing, Figure 4 is a fragmentary plan view of the assembly shown in Figure 3, with the load carrying frame removed, and Figure 5 is a sectional view showing a further detail of construction.

In Figure 1 of the drawings the invention is shown as applied to a motor driven chassis of the scooter type such as is illustrated and described in co-pending application entitled Power Driven Hand Truck, Serial No. 737,876, filed March 28, 1947, now Patent No. 2,468,316, granted April 26, 1949, by John L. Waters and assigned to the assignee hereof. In this showing the chassis, designated generally by the numeral 10, has a trailing portion 11 which carries a power plant 12 that serves to impart motion to driving wheels 13 and thus move the chassis from one point to another when in operation. At its forward end the chassis 10 has a front axle 14 which is connected through a vertical spindle 15 and a horizontally disposed swivel connection 16 to the trailing portion of the chassis. In this manner the front axle 14 is adapted to turn with respect to the trailing portion of the chassis 11 for steering and because of the swivel connection 16 the axle 14 may rock from one side to the other to accommodate the chassis to uneven surfaces. At each of its ends the forward transversely extending axle 14 has pneumatically tired wheels 17 which for ease of operation are of a relatively larger diameter than are usually provided upon trucks of this type. The axle 14 is preferably of square cross-section and clamped firmly thereupon there is a frame supporting member 18 which has a forward depending portion in the form of two spaced bracket-like extensions 19 and a rearwardly extending portion 20. The bracket-like extensions 19 are here shown as carrying a transversely extending shaft 21 and the rearwardly extending portion 20 carries a latching abutment 22 all of which, as will hereinafter appear, serve to form a firm support for a load carrying frame 23 which completes the truck assembly.

As is more clearly shown in Figures 2 and 3 of the drawings, the load carrying frame 23 has two depending side plates 24 each of which have an elongated slot 25 through which the transversely extending shaft 21 is extended to provide a pivotal support therefor. Mounted outwardly from its underside the load carrying frame 23 has a pair of spaced latching bars 26 that are adapted to cooperate with the latching abutment 22 carried by the rearwardly extending portion of the frame supporting member 18. As is clearly shown in Figure 2 of the drawings, the latching abutment 22 is beveled along its upper edges so as to wedge between the spaced bars 26 of the latching means when the load carrying frame 23 is moved into a reclining position with a load thereupon. When the frame 23 is latched in this position the spaced latching bars 26 will become seated in opposed notches 27 formed in the sides of the latching abutment 22. These spaced latching bars 26 are pivotally secured at their ends to spaced links 28 and 29, the latter of which is extended at one end for connection with an operating rod 30. In this manner the links 28 and 29 may be turned in unison to spread the latching bars 26 whenever it is desired to tilt the load carrying frame 23 forward to pick up or discharge a load. Normally the spaced latching bars 26 are biased toward each other and into an operative position by means of tension springs 31 and 32 which are connected between the opposite ends thereof. With this arrangement it will be seen that when the load carrying frame 23 is reclined, as indicated in Figures 1 and 3 of the drawings, it will be firmly held upon the frame supporting member 18 so that no effort will be required on the part of the operator to balance the load over the front axle 14 and further, as is more clearly shown in Figure 4 of the drawings, with the vertical spindle 15 located centrally between the wheels 17 upon the axle 14 it will be readily seen that the axle 14 with the frame supporting member 18 and the load carrying frame 23 may be turned as a unit with respect to the trailing portion of the chassis 10 to effect a steering thereof. This turning may be controlled by an operator riding upon an extending platform 33 at the rear of the chassis 10 by grasping a rearwardly extending handle bar 34 at the upper end of the load carrying frame 23.

In operation and with particular reference to Figure 3 of the drawings it will be seen that when the load carrying frame 23 is in its reclining position the transversely extending shaft 21 will be disposed at the upper ends of the slots 25 in the side plates 24 and in this way the load will be substantially balanced over the front axle 14 of the truck. In picking up a load, with the pneumatically inflated tires carried by the wheels 17 normally inflated the load carrying frame 23 will be capable of assuming the position, here indicated by dot and dash lines, with an extending lip 35 at the forward end thereof extending in a substantially horizontal plane. Now if the tires of the wheels 17 should become deflated it will be readily seen that this will drop the transversely extending shaft 21 towards the ground and thus, but for the present improvement, prevent a full forward tilting of the load carrying frame 23 into this position. However, because of the slotted engagement between the transversely extending shaft 21 provided by the slots 25 in the side plates 24 the frame 23 may still be tilted forward into the position here shown or even into a substantially vertical position by bringing the lip 35 into contact with the ground and then tilting the load carrying frame 23 independently of the transversely extending shaft 21. Then with the lip 35 extended under a load the frame 23 may be drawn back and into its reclining position and out of contact with the ground, as shown in Figures 1 and 3 of the drawings, where it may be latched by bringing the latching bars 26 into interlocking relation with the latching abutment 22, as shown in Figure 5 of the drawings. After the load has been thus picked up and supported upon the front axle 14 of the chassis 10 it will be possible to carry it to any desired distant point as will be readily understood.

While I have, for the sake of clearness and in order to disclose the invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is—

1. In a hand truck for transporting small loads from one point to another, the combination of a chassis having driving wheels at its trailing end, an axle at the forward end of said chassis having wheels at its ends adapted to be turned with respect to said chassis to effect a steering thereof when in motion, a frame supporting member upon said axle having a forward depending portion and a rearward extending portion, a frame supporting shaft carried by the forward depending portion of said member forwardly of and disposed parallel to said axle, a latching element carried by the rearward extending portion of said frame supporting member, and a load carrying frame pivotally mounted upon said shaft for a forward tilting movement to engage a load and for rearward reclining movement to carry the load thereon, and means carried by said frame adapted to engage the latching element and retain said load carrying frame in a reclined position when a load has been picked up by a rearward tilting thereof.

2. In a power driven hand truck for transporting small loads from one point to another, the combination of a chassis having a power plant and driving wheels connected to said power plant at its trailing end, a transversely extending axle pivotally mounted at the forward end of said chassis having wheels at its ends and adapted to be turned with respect to said chassis to effect a steering thereof when in motion, a frame supporting member secured to said axle having a forward depending portion and a rearward and upwardly extending portion, a frame supporting shaft carried by the forward depending portion of said member below and forwardly of the axle, a latching element carried by the rearward and upwardly extending portion of said frame supporting member, and a load carrying frame pivotally mounted upon said shaft for a forward tilting movement to engage a load and a rearward reclining movement to carry the load thereon, and a second latching element carried by said frame adapted to engage with the latching element carried by the rearward and upwardly extending portion of said frame supporting member and retain said load carrying frame in a reclining position upon said frame supporting member when a load has been picked up by said load carrying frame.

3. In a load carrying truck of the character described, the combination of a transversely extending axle having wheels with pneumatically inflated tires at the ends thereof, a frame supporting member secured in a fixed position upon said axle and having spaced forwardly depending brackets terminating within the outer limits of said pneumatically inflated tires, a transversely extending shaft carried by said brackets substantially below the level of the wheel mounting axle, and a load carrying frame pivotally mounted upon the terminal ends of said shaft for a forward tilting movement to engage a load, characterized by the fact that the pivotal connection between said load carrying frame and said transversely extending shaft will support the load carrying frame in its pivotal movement when moved from inclined to load engaging position and will then permit relative movement between carrying frame and said shaft when said load carrying frame is in contact with the ground and is tilted into a vertical position with respect to said chassis.

4. In a load carrying truck of the character described, the combination of a transversely extending axle having wheels with pneumatically inflated tires at the ends thereof, a frame supporting member secured in a fixed position upon said axle and having spaced forwardly depending brackets, a transversely extending shaft carried by said brackets substantially below the level of the wheel axle and disposed within the outer limits of said pneumatically inflated tires, and a normally reclined load carrying frame pivotally mounted upon said shaft for a forward tilting into a vertical position to engage a load, characterized by the fact that the said load carrying frame is slotted to receive said transversely extending shaft and to provide for positive support for the frame when inclined and free relative movement therebetween when loading and permit said load carrying frame to be tilted into its full vertical position irrespective of any deflation of said tires.

5. In a load carrying truck of the character described, the combination of a transversely extending axle having wheels with pneumatically inflated tires at the ends thereof, a frame supporting member secured in a fixed position upon said axle and having spaced forwardly depending brackets, a transversely extending shaft carried by said brackets and disposed within the peripheral limits of said pneumatically inflated tires, and a normally reclined load carrying frame pivotally mounted upon said shaft for tilting into a vertical load engaging position, characterized by the fact that the pivotal connection between said load carrying frame and said transversely extending shaft is formed by providing slightly arcuate and inclined slots at the sides of said load carrying frame through which said shaft is extended to positively support the frame when inclined and while said load carrying frame is being moved to and from loading position and permitting the load carrying frame to be supported by the ground independently of said shaft and tilted into a full vertical position irrespective of any deflation of said tires.

DAN A. LYONS.

REFERENCES CITED

The following references are of record in the file of this patent:

UNITED STATES PATENTS

| Number | Name | Date |
|---|---|---|
| 1,827,209 | Robbins | Oct. 13, 1931 |
| 2,030,925 | Lea | Feb. 18, 1936 |
| 2,052,697 | Cochran | Sept. 1, 1936 |
| 2,118,711 | McKinney | May 24, 1938 |
| 2,377,389 | Waters | June 5, 1945 |

FOREIGN PATENTS

| Number | Country | Date |
|---|---|---|
| 120,657 | Great Britain | Nov. 21, 1918 |